UNITED STATES PATENT OFFICE.

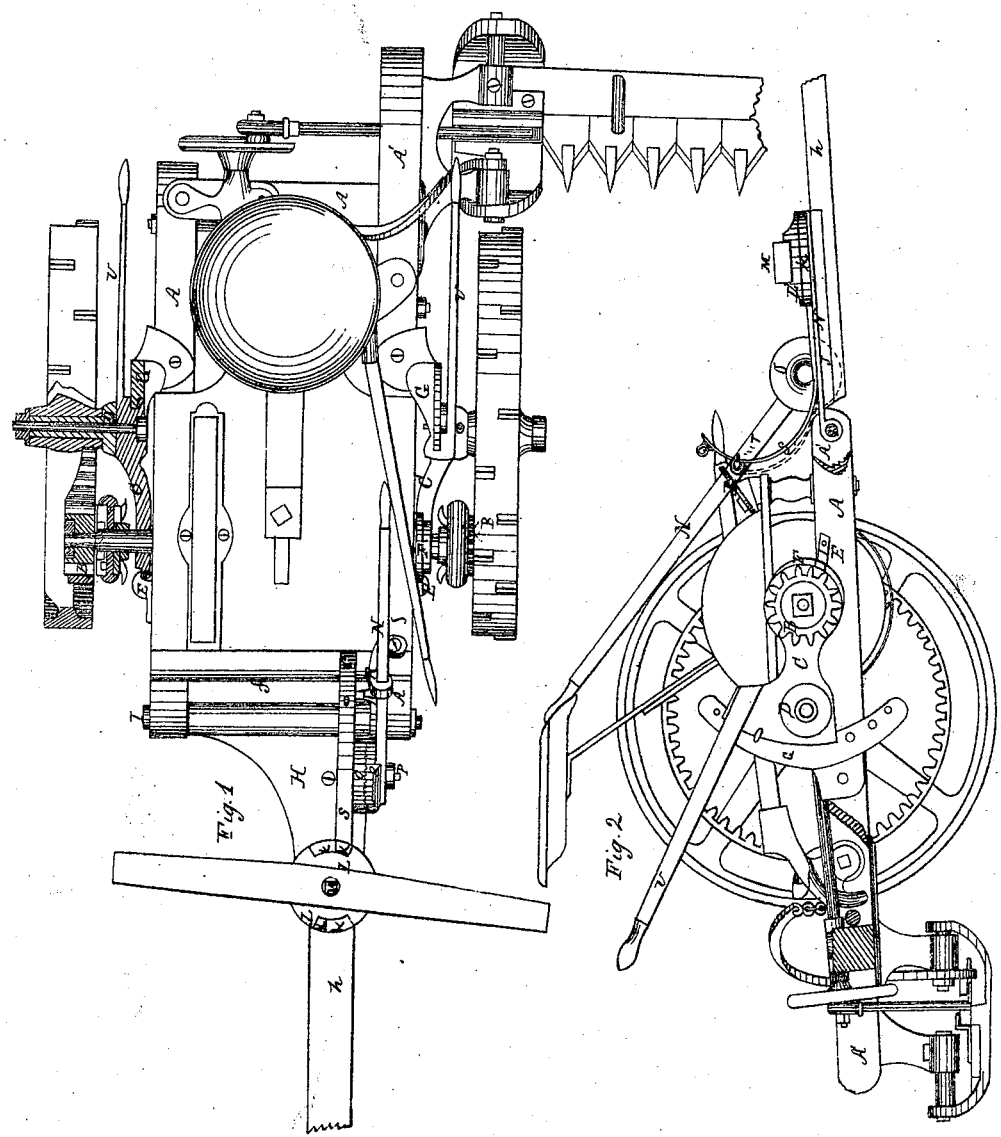

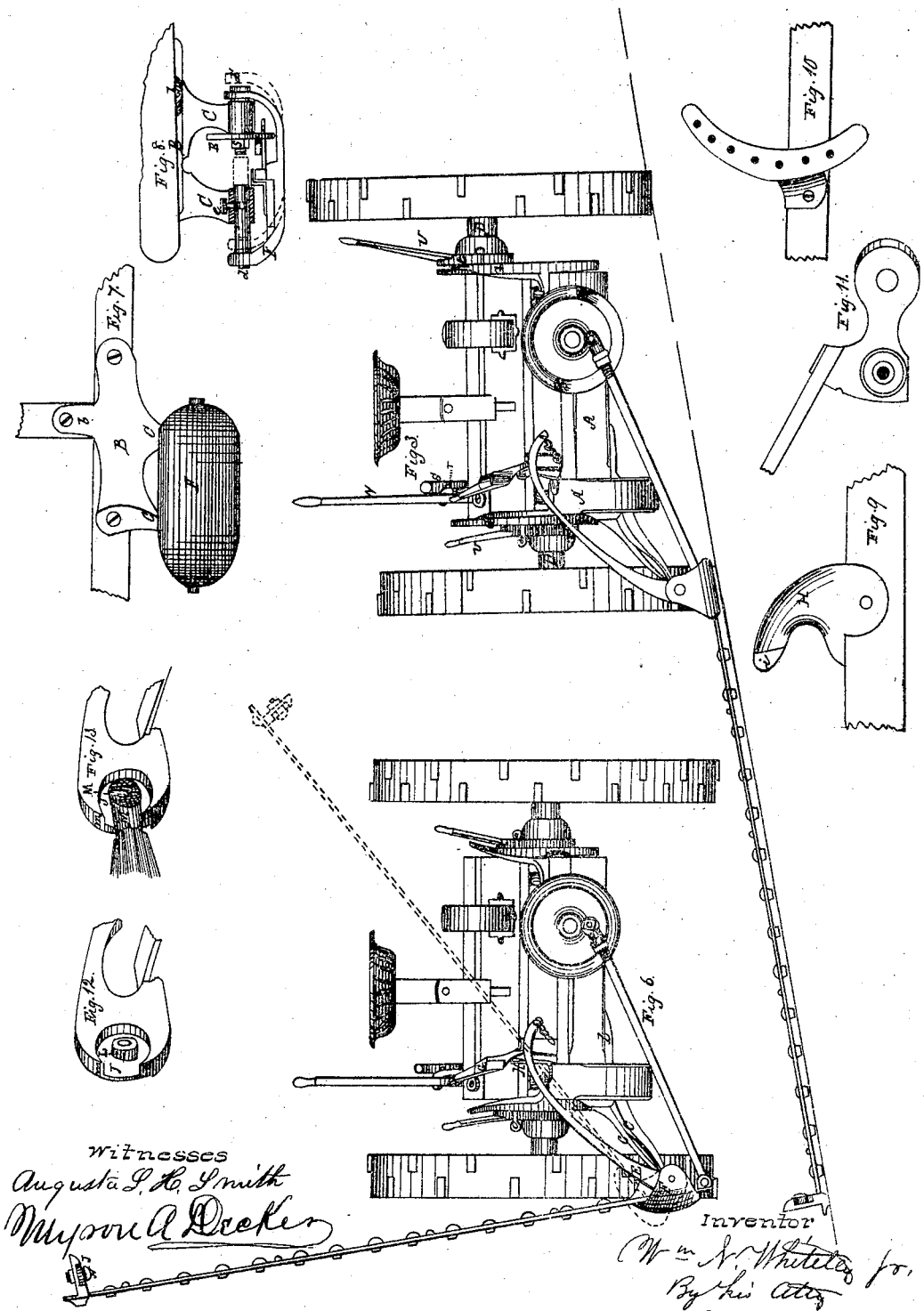

WILLIAM N. WHITELEY, JR., OF SPRINGFIELD, OHIO.

IMPROVEMENT IN HARVESTERS.

Specification forming part of Letters Patent No. 52,350, dated January 30, 1866.

*To all whom it may concern:*

Be it known that I, WILLIAM N. WHITELEY, Jr., of Springfield, in the county of Clarke and State of Ohio, have invented a new and useful Improvement in Harvesters (Case B); and I do hereby declare the following to be a full, clear, and exact description of the same, reference being had to the accompanying drawings, in which—

Figure 1 is a plan view of my machine. Fig. 2 is an elevation of the outer side of the same, the outer bearing-wheel being removed. Fig. 3 is a rear elevation of the same, showing the adjustments for mowing upon a side-hill. Fig. 4 is an elevation of the curved standard, and Fig. 5 is an elevation of the sector-plate.

The nature of my invention consists, first, in the manner of attaching the tongue to the main frame so that none of the strain of the draft comes upon said tongue; second, in the manner of making the tongue rigid or not, at the will of the driver; third, in the manner of keeping the cutting apparatus near to the ground when the machine is going down hill and the draft is thereby lessened.

That others may understand the construction and operation of my invention, I will more particularly describe it.

The main frame A of the machine is constructed of rectangular form, and the inner or left-hand side piece is allowed to project some distance in rear of the frame, and to this projection the cutting apparatus is attached, in the manner more fully set forth and described in my application "A," filed herewith. The main driving-shaft of the cutting mechanism is attached transversely to said frame by suitable boxes and bearings. Upon each end of this shaft is attached a pinion, B, which gears into the main driving-gear of bearing-wheel.

In order to secure the proper connection between the pinion and its driver, while the axis of the latter is at all times at liberty to rise and fall in respect to the pinion, I provide a plate, C, Fig. 5, which I place upon the driving-shaft as a center of motion, and to the other end of which I attach the axle D of the driving-wheel. In this way, as will be readily perceived, the center of the driver will always be at a uniform distance from the center of the pinion, notwithstanding any vertical change of position in respect to each other. The attachment of the plate C to the shaft is simply by inserting the end of the latter through a hole in the former, and then retaining the plate in place by means of a hooked piece of metal, E, which is secured to the main frame, and embraces under its hooked end the edge of the plate; or, a better mode of construction is to form an eccentric rib, F, upon the edge of the plate C, and to let the hook spoken of embrace this rib. I am then enabled to remove the plate C from the driving-shaft without removing the hooks from the frame by simply turning the plate up into such a position as shall remove the eccentric rib from under the hook, and then the plate may be removed without trouble. In order to retain the plate C in a proper and perpendicular position, and at the same time allow it to move freely up and down upon its center of motion, I form the free end in the arc of a circle whose center is the center of the main driving-shaft upon which the plate is pivoted, and upon the circular edge I form a groove, into which fits the corresponding concave edge of a standard, G, which I securely bolt through horizontal and vertical flanges to the main frame. This formation is clearly shown in Fig. 1. The axle of the bearing-wheel is formed of a sleeve and bolt, as shown. The plate C is secured to the concave standard G by a pin put through any one of a series of holes, as desired, and thus the height of the main frame from the ground may be modified and regulated, as desired.

At the front of the main frame is the plate H, to which the double-trees and tongue are both attached. This plate is made broad enough at its rear end to fill the space between the ends of the side timbers of the frame, as shown in Fig. 1, and it is attached to those ends, and thus to the frame by a bolt, I, which passes through suitable lugs or perforations of the plate H, and through the ends of the side pieces. This bolt is provided with a head upon one end and a nut at the other, and serves to bind the front end of the frame together, at the same time that it acts as a pivot upon which the tongue moves up and down.

On the under side of the plate H, I fashion two ridges or ribs, J, and between them the tongue is secured by one or two bolts. They prevent any lateral strain upon the bolts, which might otherwise cause the tongue to split.

At the forward end of the plate H, and upon its upper side, is the disk K, having the two stop-pieces k k, and upon this disk is fitted the disk L, which has notches in its edge to correspond to the stop-pieces, so that it may have only a limited rotary movement upon the bolt M, which keeps it in place. To this upper disk, L, the double-trees are secured by ribs or flanges projecting upward at each side, and by the bolt which passes downward through the center of the disks. As by these means the double-trees are secured immediately to the plate H and not to the tongue, it is evident that the strain and labor of draft does not come in any degree upon the tongue.

It is always necessary to provide means for adjusting the angle of elevation of the tongue in respect to the frame of the machine, and it is also desirable that it should be under the control of the attendant—that is, that he should always have it in his power to render the tongue rigid or not, as desirable. I propose to accomplish this by providing the lever N, which has an adjustment of its own, with the tongue, by means of the serrated plates O o, which are locked by the bolt P, so that they are rigidly secured together in any desired position of the lever. The hook R serves to secure the lever N back against the front of the frame whenever it is desired to make the tongue rigid, for if the lever is rigid to the tongue and also to the frame, it follows that the tongue must also be rigid to its frame. The lever N is convenient to the hand of the attendant, and he can at any moment free the lever from the hook and liberate the tongue. It is sometimes necessary to do this in driving over descending ground, as then the machine will sometimes pitch forward, causing the cutting apparatus to run too lightly upon the ground. The spring S is provided for use at such times. It is rigidly attached to the tongue-plate, and, curving backward and upward, rests against the front of the driver's platform, as shown by red line in Fig. 2.

At a convenient point on the side of the lever N is a stud, T, having a hooked end. The spring S is pushed forward until it rests against the front side of this stud, when the said spring is not required for use. The hook at the end of the stud T may rest in a hole through the proper part of the spring, so as to keep the spring always in the right shape. If the occasion for using the spring S be only temporary, or if the spring becomes inoperative by reason of fracture, or other cause, the driver may place his foot against the stud T, and by pushing the lever N from him cause the same effect as the spring would if in use.

The levers U are simply for the more convenient handling of the machine in making the necessary adjustments, as by pressing the outward end of said lever downward it causes the frame to rise, for in that case the force of leverage acts over the axle of the main driving-wheel as a fulcrum.

The operation of my machine, as embraced in this application, has already been clearly set forth, and but little need be said by way of explanation thereof.

When the machine is to be used upon level ground the frame is set high or low according to the circumstances of the case, and in practice the machine may be readjusted at any time, and even while the attendant is riding upon it, nothing being necessary except to withdraw the pin from the plate C and standard G, when the frame of the machine may be raised or lowered at pleasure.

When the ground is sidling, as is very frequently the case, a machine having a jointed cutting apparatus, as commonly constructed, cannot be used with safety, for the bearing-wheels of a harvester are so near together in proportion to their diameter that one side cannot be raised from the ground more than a few inches without danger of upsetting—a casualty full of danger to the driver, who would be thrown directly in front of the cutters. With a harvester having independent wheels, such as here represented, this danger may be fully guarded against, for the machine may be adjusted to accommodate it to any ordinary inclination of the ground, as is shown in Fig. 3, where the machine is represented as running along a sidling piece of ground, and while the cutters conform to the surface the platform and frame of the machine are level, and there is no more danger of upsetting than upon level ground.

If, in cutting down a declivity the machine tends to tilt forward so as to raise the cutters from the ground, that tendency may be counteracted by liberating the spring S, which, when pressing against the front of the platform, tends to depress the tongue; but as the tongue is supported by the necks of the horses and cannot be thrown down, it follows that the rear end of the machine must yield instead. If the occasion be only temporary, the driver may place his foot against the stud T, and by pressing forward against it he will bear the cutting apparatus against the ground just as the spring S would do. In either of these cases it is necessary to liberate the lever by turning the hook R back.

Having described my invention, what I claim as new, and desire to secure by Letters Patent, is—

1. In combination with the tongue-plate H, the draft-disks L and K, so that the strain of the draft will be communicated through said plate to the frame of the machine, and not through the tongue.

2. In combination with the tongue of the machine, the serrated disks O and o, and the hand-lever N, for the purpose set forth.

3. In combination with the hand-lever N, the hook R, for the purpose of holding the tongue rigid, when desired.

4. The spring S, or its equivalent, for the purpose set forh.

WM. N. WHITELEY.

Witnesses:
R. D. O. SMITH,
A. S. H. SMITH.